July 17, 1956

A. J. FEDERKIEL 2,754,698

SHIFTER MECHANISM FOR TWO SPEED BICYCLE TRANSMISSIONS

Filed May 6, 1955

INVENTOR.
ARTHUR J. FEDERKIEL
BY Gobrick and Gobrick
ATTORNEYS

July 17, 1956   A. J. FEDERKIEL   2,754,698
SHIFTER MECHANISM FOR TWO SPEED BICYCLE TRANSMISSIONS
Filed May 6, 1955   2 Sheets-Sheet 2

INVENTOR.
ARTHUR J. FEDERKIEL
BY *Gobrick and Gobrick*
ATTORNEYS

United States Patent Office 2,754,698
Patented July 17, 1956

2,754,698

SHIFTER MECHANISM FOR TWO SPEED BICYCLE TRANSMISSIONS

Arthur J. Federkiel, Rocky River, Ohio, assignor to The Murray Ohio Manufacturing Company, Cleveland, Ohio, a corporation of Ohio Application May 6, 1955, Serial No. 506,619

6 Claims. (Cl. 74—781)

This invention relates to improvements in shifter mechanisms for bicycle speed change gearing devices.

The present invention relates to shifter mechanisms for two speed planetary transmissions wherein the sun gear of the gear train is non-shiftable on the bicycle axle and is locked in the gear train for direct drive and locked against rotation for underdrive. The entire shifter mechanism is arranged exteriorly of the axle as distinguished from that type of shifter mechanism which extends through a hollow axle. In the present mechanism the arrangement is such that no element extends through the bearing elements supporting the hub and the device is spring operated under normal bicycle riding conditions to maintain the gear train locked in direct drive.

The general object of the invention is the provision of a shifter mechanism which will be external of the axle structure and confined to a limited space between the rear hub of a bicycle and a fork prong to which the axle is attached. More specifically the object of the present invention is the provision of a torsion spring operated shifter mechanism for a two speed planetary type bicycle transmission which is adjustable for extent of spring load whereby the shifter mechanism is maintained normally in direct drive position.

Other objects of the invention will become apparent from the following description referring to the accompanying drawings. The essential characteristics are summarized in the claims.

In the drawings—

Figure 1:
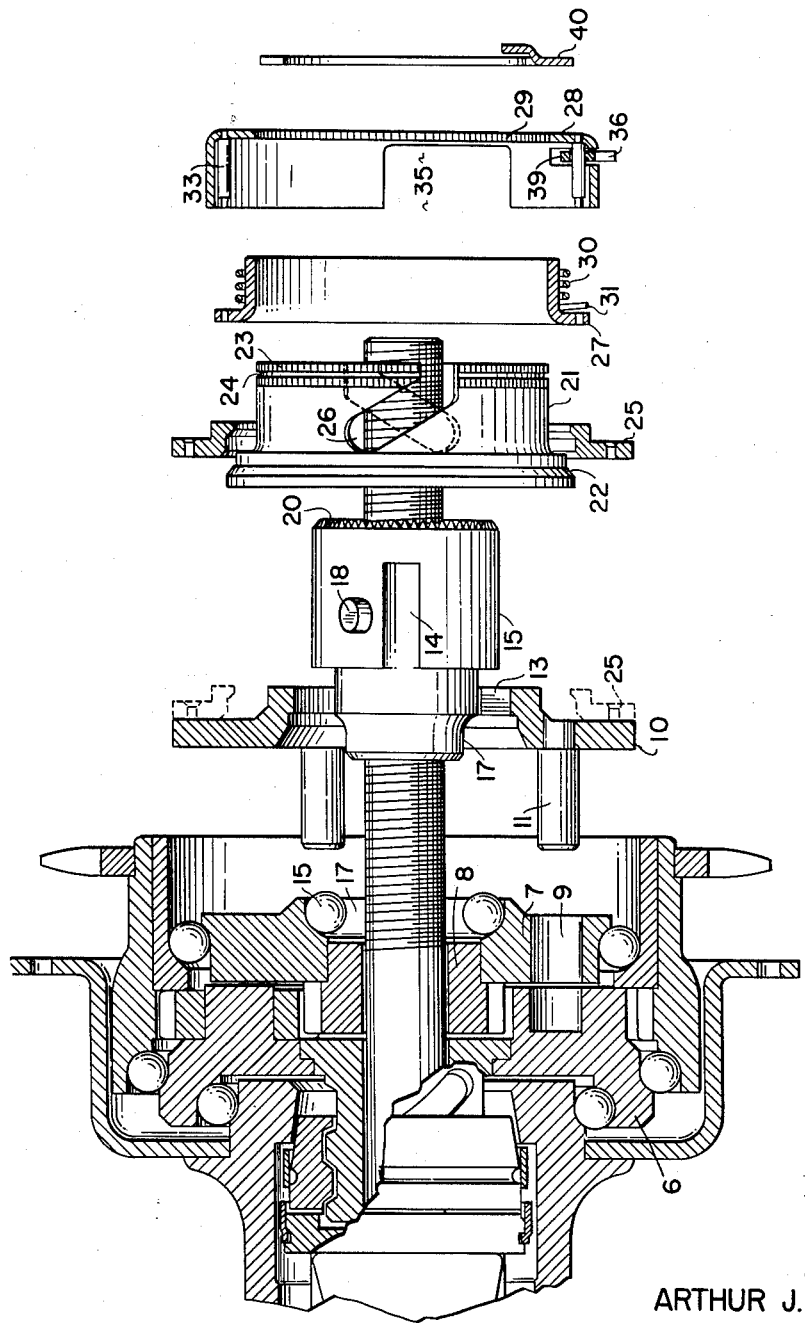
Fig. 1 is an exploded view of the shifter mechanism relative to the planetary system.

Referring to Fig. 1 of the drawings, there is shown at the left in assembled relation a bicycle hub with an end enlargement forming a housing for a two speed planetary transmission gearing mechanism; a planetary carrier 6 internally supported through ball bearings on a central end extension of the hub and in turn at its outer periphery supporting through ball bearings the inner end of a ring gear carrying a chain sprocket input member; a portion of a well-known coaster brake mechanism including a clutch element for engaging the hub for forward drive and applying a braking force on reverse pedal action, and also a coarse clutch and brake actuating screw fixed with the planet carrier as a transmission output element; and a plate 7 to which the sun gear 8 is fixed, a ball bearing support being provided between the external periphery of plate 8 and the interior of the chain sprocket member.

The plate 7 is interiorly supported by a bearing cone member 15 through ball bearing on the cone formation 17. Three equi-angularly spaced openings 9 through the plate 7 are axially alignable with corresponding sockets in the face of the planet carrier 6. An axially shiftable locking plate 10 carries three pins 11 engaged in openings 9 in assembled position. The locking plate 10 also has three integral inner keys or lugs 13 which slide axially into keyways 14 formed in the bearing cone member 15 when the locking plate 10 is shifted to the right to free pins 11 from the planetary carrier. Since the bearing cone member 15 is threaded on the axle and, by outer end teeth 20 biting into the adjacent fork prong of the bicycle, is non-rotatable in final assembly. Upon a shift of the plate 10 to the right, the entry of lugs 13 in keyways 14 locks the sun gear while the planetary carrier is free to rotate, giving a low speed drive. When the plate 10 is shifted to the left, freeing the lugs 13 from the bearing cone member, the pins 11 engage the planet carrier 6, so that carrier, sprocket and ring gear, sun gear plate 7 and plate 10 rotate simultaneously for direct drive.

The shifter mechanism per se comprises a camming barrel 21 revolvably mounted on the bearing cone member 15. The barrel has two opposite helical camming slots 26 opening axially at the outer ends thereof for entrance of cam lugs 18 fixed on the bearing cone member 15. The camming barrel 21 also has a swivel bearing formation 22 which is connected to the locking plate 10 by an overhanging ring member 25 suitably secured to the locking plate. Thus when the cam barrel is turned through a limited angle the locking plate 10 will be axially shifted, while plate 10 and cam barrel 21 are rotationally independent.

Figure 2:
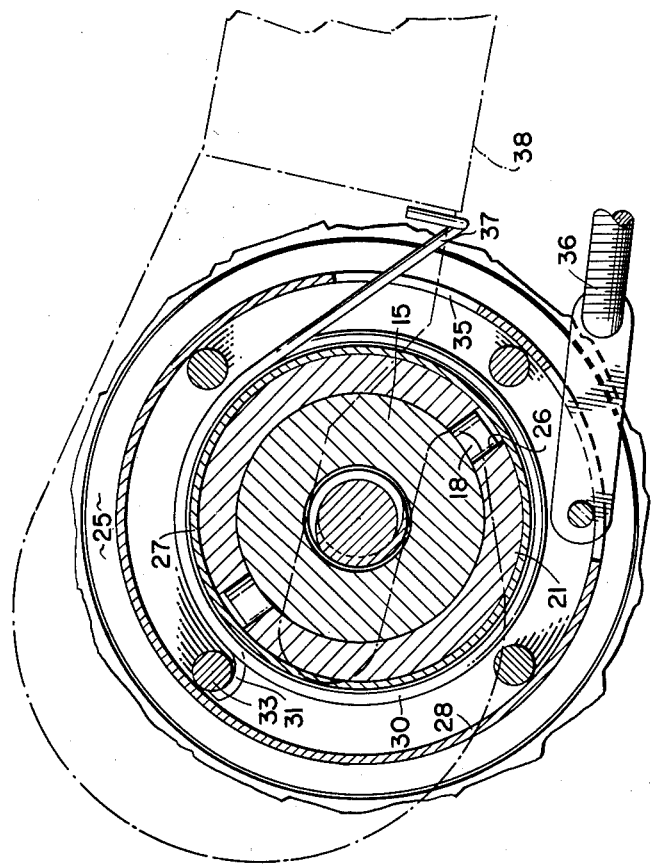
Fig. 2 is a section taken perpendicular to the axle through a torsion spring cage structure of the shifter mechanism to show the manner of anchoring the ends of a torsion spring.
Figure 3:
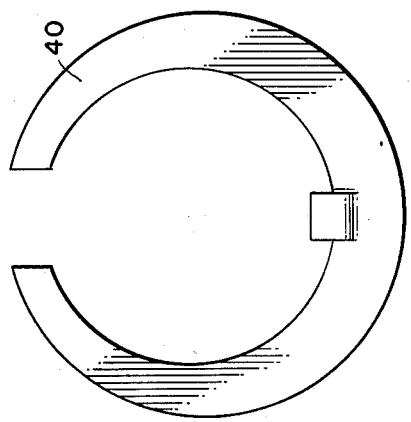
Fig. 3 is an end view of a locking snap ring for holding the spring housing on the camming shifter mechanism.

The manually operated means for rocking the cam barrel comprises a torsion spring housing with attached pull rod 36 (Fig. 2). There is an adjustable connection between the cam barrel and the spring housing which permits a spot location of the connection between the pull rod and the cam barrel so that in mass production the direction and amount of rod movement will be the same on all of the bicycles. The torsion spring housing consists of two telescoped externally and internally end-flanged members 27—28 which when placed together are secured by internally disposed rivet posts 33 with the spring 30 disposed therein. Member 28 has portions cut away at 35 and 39 for spring and pull rod connections to be described. The enclosed torsion spring 30 has several convolutions and terminates at the inner end thereof in a spring arm 31 which anchors or hooks upon one of the posts 33 (see Fig. 2). Through the opening 35 of member 28 extends the other end 37 of the torsion spring, which is hook-shaped to grasp upon a tube or prong 38 of the lower rear fork structure of the bicycle. The spring is assembled in somewhat pretorsioned condition. Thus the spring housing is in effect a lever connected to the pull rod.

The means for effecting rotational adjustment of the lever spring housing relative to the cam barrel 21 comprises a knurl formation 23 on the outer part of the cam barrel and having a groove 24 cut therethrough near the outer end of the cam barrel. The spring housing member 28 has a bore fitted to the circumference of the cam barrel and with knurls 29 that mesh with the knurls 23 formed on the cam barrel. A split retaining spring shoe or snap ring 40 outward of member 28 fits in the groove 24 of the cam barrel to hold the spring housing on the latter.

The ease of manufacture and assembly of the device will be apparent to those skilled in the art. The cam barrel 21 is first cam threaded onto the pins 18 of bearing cone member 15 and the swivel connection 22 with the lock plate is completed by attachment of the ring 25 to the plate 10. The gearing having first been inserted in the hub, the bearing cone 15 is then screwed into adjusted position to complete the bearing at 17.

The spring and housing comprise a preassembly with the torsion spring designed to be pretorsioned and the pull rod end pivoted on a post or rivet 33. The spring housing is then placed upon the cam barrel and the spring lock ring 40 then is snapped into the groove 24. The axle clamping nut (not shown) is then tightened on the right end of the axle bringing the teeth 20 of the end of the bearing cone into biting engagement with the inner face of the prong of the rear fork structure of the bicycle. The spring arm 37 is then drawn or pulled into position to bring the hooked end thereof around and into engagement with the fork member 38.

A pulling force applied to rod 36 rotates the cam barrel counter-clockwise in Fig. 2 to move plate 10 outward to low speed setting, at the same time winding the spring to produce a force which will tend to rotate the barrel clockwise for a return of locking plate 10 toward a direct drive setting when the pull rod is released. When pins 11 enter the planet carrier, the revolving travel of the cam barrel in the motion produced by the torsion spring is limited by the cam pins 18 abutting the end wall portions of the helical cam formations so that no spring pressure is exerted on the swivel connection to the locking plate during normal or direct drive setting. The connection between the spring housing and the cam barrel is such that the spring tension may be varied without removing the spring from the assembly.

I claim:

1. In a shifter mechanism for a two speed bicycle transmission of the planetary type comprising a bicycle axle mounted on the prongs of the rear fork of a bicycle frame, a bearing cone member in threaded engagement with the axle and adapted to lock on the fork prong of the bicycle frame, a sun gear rotatably supported by the bearing cone member, said bearing cone member having radially disposed camming pins fixed thereon, a camming barrel surrounding and turnable upon the bearing cone member, a sun gear locking member swivel connected to the barrel, said barrel having helical slots in which the fixed pins on the bearing cone member have a camming action when the camming barrel is turned, a spring carrying mechanism fixed on the cam barrel, a torsion spring carried by the mechanism with an inner end acting on the spring carrying mechanism and the other end adapted to react on the said rear fork structure of a bicycle and a pull rod connection on the spring carrying mechanism.

2. In a shifter mechanism for a two speed bicycle transmission of the planetary type comprising a bicycle axle mounted on the prongs of the rear fork of a bicycle frame, a bearing cone member in threaded engagement with the axle and adapted to lock on the inner face of the fork prong of the bicycle frame, a sun gear rotatably supported by the bearing cone member, said bearing cone member having radially disposed camming pins fixed thereon, a camming barrel surrounding and turnable upon the bearing cone member, a sun gear locking member swivel connected to the barrel, said barrel having helical slots opening outwardly in which the fixed pins on the bearing cone member have a camming action when the camming barrel is turned, a spring mounting mechanism fixed on the cam barrel, a torsion spring carried by the mechanism with an inner end acting on the spring mounting mechanism and the other end adapted to react on the said rear fork structure of a bicycle and a pull rod connection on the spring carrying mechanism.

3. In a shifter mechanism for a two speed bicycle transmission of the planetary type comprising a bicycle axle mounted on the prongs of the rear fork structure of a bicycle frame, a bearing cone member adapted to lock on one of the said fork prongs of the bicycle frame, a sun gear rotatably supported by the bearing cone member, said bearing cone member having radially disposed camming pins fixed thereon, a camming barrel surrounding and turnable upon the bearing cone member, a sun gear locking member swivel connected to the barrel, said barrel having helical slots in which the fixed pins on the bearing cone member have a camming action when the camming barrel is turned, a spring carrying mechanism adjustably fixed on the cam barrel whereby the spring effort of a torsion spring carried thereby may be adjustably varied, said torsion spring carried by the mechanism having an inner end acting on the spring carrying mechanism and the other end of the spring being adapted to react on the said rear fork structure of the bicycle frame normally to maintain the barrel cammed inwardly and a pull rod connection on the spring carrying mechanism.

4. In a shifter mechanism for a two speed bicycle transmission of the planetary type comprising a bicycle axle mounted on the prongs of the rear fork structure of a bicycle frame, a bearing cone member adapted to lock on one of the fork prongs of the bicycle frame, a sun gear rotatably supported by the bearing cone member, said bearing cone member having radially disposed camming pins fixed thereon, a camming barrel surrounding and turnable upon the bearing cone member, a sun gear locking member swivel connected to the barrel, said barrel having helical slots in which the fixed pins on the bearing cone member have a camming action when the camming barrel is turned, a torsion spring, a torsion spring carrying mechanism adjustably fixed on the cam barrel there being a notch connection between the spring carrying mechanism and the barrel for adjusting the torsion of the spring, said torsion spring being carried by the mechanism with an inner end acting on the spring carrying mechanism and the other end adapted to react on the fork structure of the bicycle frame and a pull rod connection on the spring carrying mechanism.

5. In a shifter mechanism for a two speed bicycle transmission comprising a bicycle axle mounted on the prongs of the rear fork structure of a bicycle frame, a bearing cone mechanism secured to the axle, a sun gear rotatably supported by the bearing cone mechanism, a helically slotted cam barrel having the slots open at one end, a shifter member adjustably fixed on the cam barrel, said shifter member having serrations meshing with serrations formed on the cam barrel, an axially shiftable transmission locking member connected to the cam barrel by a swivel connection whereby a revolving movement of the cam barrel with effect an axial shifting of the transmission locking member and a torsion spring surrounding the cam barrel, said spring being adapted to extend to a hooked connection with the fork structure of the bicycle frame at one end and to the shifter member at the other end.

6. In a shifter mechanism for two speed bicycle transmissions comprising a bicycle axle mounted on the prongs of the rear fork structure of a bicycle frame, a bearing cone mechanism fixed on the axle, a sun gear rotatably supported by the bearing cone mechanism, said bearing cone mechanism including a tubular formation extending outwardly to a gripping contact with the inner face of one of the axle prongs of the rear fork structure of the bicycle, a hollow rockable member on the tubular formation forming a torsion spring housing, a camming barrel to which the housing is fixed, a camming pin connection between the camming barrel and the tubular formation, an axially shiftable locking plate swivel connected to the camming barrel and a torsion spring acting on the housing and camming member to maintain the locking plate in a normally inward position.

References Cited in the file of this patent
UNITED STATES PATENTS
2,291,485    Musselman            July 28, 1942